Patented Dec. 10, 1940

2,224,159

UNITED STATES PATENT OFFICE 2,224,159

PROCESS FOR PURIFYING WOOD PULP

Arthur N. Parrett and Elliott H. Woodruff, Shelton, Wash., assignors to Rayonier Incorporated, San Francisco, Calif., a corporation of Delaware No Drawing. Application September 27, 1937, Serial No. 165,923

6 Claims. (Cl. 92—11)

This invention relates to a process of manufacture of wood pulp substantially freed of resin and colored matter from woods containing resins of high acid number. More particularly our invention or discovery relates to the manufacture of sulphite wood pulp with a high degree of removal of resins and colored matter from such pulp, so as to render the same highly suitable for the manufacture of rayon, cellulose derivatives and fine papers.

When sulphite wood pulp is manufactured from highly resinous woods, the unbleached pulp produced contains resinous bodies, waxes, lignin, and other colored impurities which are only incompletely removed by ordinary bleaching methods. These resins, when present in sulphite pulp, cause trouble in paper-making, and are also highly objectionable when such sulphite pulp is utilized for the production of rayon and for the production of cellulose derivatives. Woods such as slash pine, loblolly, yellow pine, jack pine, and longleaf pine are examples of woods containing high proportions of resinous bodies and these woods have not been used extensively for the production of sulphite pulp because pulp produced from such woods is objectionable due to the high proportion of resins and colored matter present therein. Eastern spruce is an example of a wood which also contains a fairly high proportion of resins, although not as high as the woods mentioned above. All of the woods mentioned above, including eastern spruce, contain resins of the "acid" type, so called because these resins have a high acid number. When the term "resin of high acid number" is used herein we mean to include wood resins present in sulphite pulp having an acid number above 40.

One method of measuring the extent of the colored materials remaining in pulp produced from these woods is to bleach such pulps by ordinary bleaching methods and then to convert such bleached pulps into nitrocellulose by a standard method. These nitrocellulose products may then be dissolved in well known organic solvents and their color observed. Following this procedure it is found that pulps produced from highly resinous woods tend to yield nitrocellulose solutions of highly colored character. However, when such pulps are treated by methods according to our discovery or invention, which largely eliminate the resinous bodies and other colored matters, the nitrocellulose produced from such purified pulps forms an almost water white solution and it is possible to carry such purification to a high degree.

This objection to the presence of colored matter extends to even minute quantities, such as small fractions of a percent. The removal of resins particularly has constituted an obstinate problem. Hence, the discovery of suitable agents to overcome the difficulties set forth has presented a most exacting problem involving fundamental factors, respecting which little is chemically known at the present time.

It is old in the art to treat cellulose such as wood pulps, cotton fabrics, etc., with alkaline solutions prior to bleaching in order to remove colored materials, resins, waxes, etc. This art also includes the use of alkaline agents which include soaps to accomplish removal of resins and colored matter. In the commercial production of wood pulp there are objections to the use of agents, such as soap, because of the danger that small amounts of fatty acids, arising from hydrolysis of the soap, will be precipitated on the fibers and remain in the finished, bleached pulp. Another objection to the use of soaps is the fact that most fatty-acid soaps are partially precipitated as an in soluble calcium soap by the calcium present in the water, unless the calcium present in the water is extremely low. Finally, soaps are quite expensive and it is highly desirable to use cheaper chemicals, free from the danger of contamination of the pulp with undesirable materials.

The resinous bodies present in slash pine, loblolly, jack pine, and other woods of the "acid" resin type, can be recovered by extraction with organic solvents from sulphite pulps made from these woods. Thus it is possible to demonstrate experimentally that resins extracted from sulphite pulps produced from these woods show some tendency to disperse in dilute caustic soda solutions. However, these dispersions tend to be turbid and opaque, a fact which indicates that the use of a caustic soda treatment for removing resinous matter from such pulps would not be very effective because the resin is apparently not fully or completely dispersed so as to be readily removed from the pulp on washing. At least numerous attempts to remove resins by caustic soda treatments have proven to be only slightly effective or hardly effective at all.

The chief object of this invention is to provide a method of purifying pulps particularly from those woods containing resins of high acid number in such a way that a large portion of the resin and other objectionable colored materials will be easily and economically removed and to provide a sequence of steps whereby such a treatment may be economically and efficiently practiced.

Our invention provides that the pulp be treated at high density and mildly elevated temperature with a dilute solution of caustic soda containing a small amount of trisodium phosphate. This treatment is preferably carried on in a bleach engine provided with extraordinarily good agitation. The degree of agitation, as well as the strength of the solutions used and the temperature of treatment, are critical factors in the effectiveness of the treatment. We prefer mild temperature conditions in the range 45° C. to 80° C. We find that the strength of the caustic solution may be varied to a certain extent. In general, the strength of the solution is a more important matter than the ratio of caustic soda to dry pulp. To effect economy in caustic soda usage and to permit the type of agitation desired, we prefer to use as high a density of pulp as practicable in the engines where the treatment is given. The degree of agitation necessary may be defined as that required to cause dispersion. It is recognized that gently stirring a compound in a liquid often may not evidence dispersion, but if drastic agitation is applied, then dispersion promptly occurs. Obviously any type of engine may be used, provided the degree of agitation or circulation is sufficient to effect the results specified. One type of engine which may be employed is the well known bleach engine equipped with a vertical worm agitator which is often inclosed in a draft tube. Ordinarily these engines are designed to turn over the mass of pulp once every seven or eight minutes. We prefer to operate these engines so that the rate of turnover is reduced to four or five minutes. Manifestly, such rate of turnover provides decidedly drastic agitation.

When sulphite pulp is circulated to an extraordinary degree at a high consistency in these engines, the mechanical squeezing and pressing action on the pulp has a marked effect in intimately distributing the caustic soda and trisodium phosphate through the mass of the pulp and apparently greatly aids in dispersing the resins, waxes, and other colored matters. The peculiar effect of these reagents is marked by a pronounced fluffing or puffing action in the mass of pulp which develops as the treatment proceeds. This effect is very novel and of an unexpected nature. The exceptional efficiency of caustic soda and trisodium phosphate in causing dispersion is evidenced by this fluffing. Obviously, the mechanical treatment provided as a desirable feature of our discovery or invention has little or no tendency to impart the characteristics resulting from beating or hydrating pulp.

We find that stock densities of 3% to 30% of dry stock represent the range of consistencies which can be agitated to give this desired effect but we prefer for reasons already given to work in the range of consistency from 12% to 30% because the mechanical agitation is more drastic and effective at these high densities. Under these conditions we prefer to maintain the alkalinity of the solution in the range 0.5% to 1.2% caustic soda based on the solution. The amount of trisodium phosphate required to properly disperse the colored materials so that they may be readily washed from the pulp lies in the range 0.05% to 0.15% anhydrous $Na_3PO_4$ also based on the solution. Higher proportions of trisodium phosphate may be used but are unnecessary and uneconomical. For a pulp consistency of 25% the caustic soda used, based on the dry weight of pulp, may be varied from 0.7% to 5%. On this same basis the trisodium phosphate expressed as the anhydrous salt may be varied from 0.3% to 1.5% based on the dry weight of pulp. It is obvious that these figures may be changed somewhat as the stock consistency is varied in the range 12% to 30%. In any case, we have discovered that the amount of caustic soda used in the process should be sufficient so that the pH of liquor in the mass of pulp at the end of the treatment should be above 11.0.

We prefer mild temperature conditions in the range already mentioned because in our treatment we do not seek to effect a purification of the pulp by means of dissolving and removing part of the cellulose itself, thereby causing a noticeable increase in the alpha cellulose content of the pulp. A small portion of the caustic soda used in the treatment may be consumed, owing to the fact that sulphite pulp may contain materials of an acid nature which combine with caustic soda. In general, however, the caustic soda used in the process of our invention or discovery remains largely unconsumed and the solution is of high alkalinity at the time the treatment is completed. When the temperature of treatment is too high, the caustic soda attacks the less resistant portions of the cellulose, a chemical reaction which forms the basis of manufacturing alpha pulp by cooking or digesting sulphite pulp with caustic soda. When this reaction of the caustic soda proceeds to any noticeable extent, we have discovered that the effectiveness of the treatment in dispersing and removing colored materials and resins becomes inhibited, or practically eliminated. In general, therefore, the temperature range in which we prefer to work lies above the temperatures ordinarily used in bleaching and considerably and safely below the temperatures practiced in the manufacture of pulp of increased alpha cellulose content by alkaline digestion or cooking, and accordingly, we find that the process of our invention or discovery operates satisfactorily within the temperature range of 45° C. to 80° C.

The time necessary to effect the desired dispersion and purification will depend somewhat on the temperature of treatment and the degree of agitation. With the agitation and the densities already described, we find that the time may be reduced to a short period, but it is practically desirable to carry on the treatment for a period ranging from 15 minutes to one and one-half hours.

In the practice of our invention, the same is not limited to the use of water of extremely low calcium content, as would be the case if fatty acid soaps were used. In general, one of the advantages of our invention is that it overcomes the limitation as to the calcium content of the water. While some precipitation of tricalcium phosphate might occur when water is used containing 15 to 20 parts per million of calcium, this is not objectionable because we have discovered that the amount of calcium phosphate precipitate absorbed by the pulp will be extremely small and is readily soluble in the acid treatment solutions usually given to the pulp subsequent to the final bleaching step, especially when the pulp is to be used for conversion into rayon, where low ash content is desirable.

The treatment step with caustic soda and trisodium phosphate, we have discovered, may best be practiced either on the unbleached pulp before any chlorine or hypochlorite bleaching or immediately after an initial bleaching step with chlorine. In either case we prefer to bleach the pulp with hypochlorite solution after the first two steps, one of which is bleaching with chlorine and the other the treatment with caustic soda-trisodium phosphate mixture. After final bleaching with hypochlorite, which may be with sodium or calcium hypochlorite, we prefer to treat the pulp with a solution of sulphur dioxide or some other mineral acid. Such acid treatments are considered to be effective in the removal of inorganic constituents which contribute to the ash content of the pulp. In addition, in this particular case, such acid treatments are very effective in the removal of small traces of calcium phosphate, which may have been absorbed by the pulp due to the presence of calcium in the pulp or in the water used for treating and washing the pulp during the caustic soda-trisodium phosphate treatment. As pointed out immediately above, the ability to readily remove these small traces of phosphate is a distinct advantage of our invention.

The following examples will illustrate the invention:

(1) Slash pine wood was chipped and cooked to a soft sulphite pulp. The unbleached pulp was washed free of sulphite liquor with water containing about 25 parts per million of calcium. At this point the pulp contained 1.4% of resinous matter as determined by extraction with ether. It was then thickened to 27% consistency. After thickening, a solution of caustic soda and trisodium phosphate was added to the pulp. The addition of chemicals was such that 4% by weight of caustic soda was 0.75% of anhydrous trisodium phosphate based on the dry fiber was added. The pulp was then agitated and steamed in a bleach engine of the well known type equipped with a worm agitator and designed to give exceptionally thorough and rapid agitation. The steam was added gradually over a period of thirty minutes until the temperature reached 74° C. The agitation was continued for thirty minutes longer and the mass was then dumped from the engine and washed with water containing about 25 parts per million calcium. After washing the pulp was then bleached, first by chlorinating and finally by bleaching with calcium hypochlorite solution under normally alkaline conditions. After final hypochlorite bleaching the pulp was washed, treated with sulphur dioxide solution and dried. The pulp thus produced was of exceptionally white color and its resinous content as determined by extraction with ether was 0.10%. The finished pulp was converted into nitrocellulose and into rayon by the viscose process and these products also proved to be of exceptionally white color and high quality.

(2) Loblolly pine was pulped by the sulphite process and was found to contain 1.1% of resinous matter extractable with ether. The first treatment step was direct chlorination, a total of 1.75% of chlorine being added to the pulp. After chlorination the pulp was washed with water containing about 5 parts per million of calcium. The pulp was then thickened to 24% consistency and a solution of caustic soda and trisodium phosphate was added in the amount of 3% of caustic soda and 1% of anhydrous trisodium phosphate based on the weight of dry pulp. This mixture was then agitated while heating to a temperature of 65° C. The mass was agitated for a total of 90 minutes. At the end of this time the pulp was washed thoroughly with water containing about five (5) parts per million of calcium. At this point the pulp was noticeably whitened by the treatment. The pulp was finally bleached with sodium hypochlorite solution and readily bleached up to a high white color. The finished pulp contained 0.09% of ether extractable matter. Nitrocellulose made from this pulp was very white.

A portion of the same lot of unbleached pulp used in the above experiment was then bleached by a three stage process consisting of chlorination followed by two stages of bleaching with sodium hypochlorite. This pulp was of considerably lower color than the pulp described above and contained 0.78% of ether extractable matter. Nitrocellulose made from this pulp was of a decided yellow color. This illustrates how relatively inefficient ordinary bleaching methods are in removing resins and colored material as compared with the process of our invention.

We claim:

1. The process of manufacturing from wood containing resins of high acid number a sulphite pulp substantially freed of resin and colored matter comprising forming a mixture of sulphite pulp of a consistency in the range of 3 to 30% and a dilute solution of caustic soda and trisodium phosphate of such concentration that the spent liquor at the end of the treatment shall have a pH of not less than 11; and thoroughly and drastically mechanically agitating the mixture at a temperature of not less than 45° C. until the fibers acquire a fluffed and puffed effect.

2. The process of manufacturing from wood containing resins of high acid number a sulphite pulp substantially freed of resin and colored matter comprising forming a mixture of sulphite pulp of 12% to 30% consistency with a solution containing caustic soda and trisodium phosphate, in such proportions that there will be present in the mixture 0.7% to 5.0% of caustic soda and 0.3% to 1.5% of anhydrous trisodium phosphate, each of which percentages is based upon the dry weight of the pulp; and thoroughly and drastically mechanically agitating the mixture at a temperature between 45° C. and 80° C. until there is developed in the mass of fibers a fluffed and puffed effect.

3. The process of manufacturing from wood containing resins of high acid number a sulphite pulp substantially freed of resin and colored matter comprising forming a mixture of said pulp of a consistency in the range of 3 to 30% and a dilute solution of caustic soda and trisodium phosphate of such concentration that the spent liquor at the end of the treatment shall have a pH of not less than 11; thoroughly and drastically mechanically agitating the mixture at a temperature of not less than 45° C. until the fibers acquire a fluffed and puffed effect; and subsequently bleaching said pulp with alkaline hypochlorite reagents.

4. The process of manufacturing from wood containing resins of high acid number a sulphite pulp substantially freed of resin and colored matter comprising chlorinating a washed sulphite pulp; forming a mixture of said pulp of a consistency in the range of 3 to 30% and a dilute solution of caustic soda and trisodium phosphate of such concentration that the spent liquor at the end of the treatment shall have a pH of not less than 11; thoroughly and drastically mechanically agitating the mixture at a temperature of not less than 45° C. until the fibers acquire a fluffed and puffed effect; and subsequently bleaching said pulp with alkaline hypochlorite reagents.

5. In the process of manufacturing a sulphite pulp substantially freed of resin and colored matter from wood containing resins of high acid number, the steps in sequence of treating said wood comprising digesting said wood by the sulphite process; washing said sulphite pulp; thickening said washed sulphite pulp to a consistency in the range of 3% to 30%, each of which percentages is based upon the dry weight of the pulp; mixing said thickened pulp with a solution of caustic soda and trisodium phosphate of such concentration that the spent liquor at the end of the treatment shall have a pH of not less than 11; thoroughly and drastically mechanically agitating the mixture at a temperature between 45° C. and 80° C. until there is imparted to the fibers a fluffed and puffed effect; washing said pulp; bleaching said washed pulp; washing said bleached pulp; and treating said washed pulp with sulphur dioxide solution.

6. In the process of manufacturing a sulphite pulp substantially freed of resin and colored matter from wood containing resins of high acid number, the steps in sequence of treating said wood comprising digesting the said wood by the sulphite process; washing said sulphite pulp; chlorinating said washed sulphite pulp; washing said chlorinated pulp; thickening said washed sulphite pulp to a consistency in the range of 3 to 30%, each of which percentages is based upon the dry weight of the pulp; mixing said thickened pulp with a solution of caustic soda and trisodium phosphate of such concentration that the spent liquor at the end of the treatment shall have a pH of not less than 11; thoroughly and drastically mechanically agitating the mixture at a temperature between 45° C. and 80° C. until there is imparted to the fibers a fluffed and puffed effect; washing said pulp; bleaching said washed pulp; washing said bleached pulp; and treating said washed pulp with sulphur dioxide solution.

ARTHUR N. PARRETT.
ELLIOTT H. WOODRUFF.